United States Patent
Himmelberger et al.

(10) Patent No.: US 10,731,053 B2
(45) Date of Patent: Aug. 4, 2020

(54) THERMALLY REVERSIBLE POLYMER CROSS-LINKING FOR PRESSURE SENSITIVE ADHESIVES

(71) Applicant: Rohm and Haas Company, Collegeville, PA (US)

(72) Inventors: Daniel W. Himmelberger, Green Lane, PA (US); Melinda L. Einsla, Royersford, PA (US); William B. Griffith, Jr., North Wales, PA (US); Brandon Rowe, Robbinsville, NJ (US)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/778,527

(22) PCT Filed: Sep. 21, 2016

(86) PCT No.: PCT/US2016/052735
§ 371 (c)(1),
(2) Date: May 23, 2018

(87) PCT Pub. No.: WO2017/091284
PCT Pub. Date: Jun. 1, 2017

(65) Prior Publication Data
US 2018/0346764 A1    Dec. 6, 2018

Related U.S. Application Data

(60) Provisional application No. 62/258,936, filed on Nov. 23, 2015.

(51) Int. Cl.
| | |
|---|---|
| *C09J 7/38* | (2018.01) |
| *C08F 220/12* | (2006.01) |
| *C09J 133/08* | (2006.01) |
| *C08F 220/14* | (2006.01) |
| *C08K 5/34* | (2006.01) |
| *C08F 220/18* | (2006.01) |
| *C09J 4/00* | (2006.01) |
| *C08K 5/3415* | (2006.01) |

(52) U.S. Cl.
CPC .............. *C09J 7/385* (2018.01); *C08F 220/12* (2013.01); *C08F 220/14* (2013.01); *C08F 220/18* (2013.01); *C08K 5/3415* (2013.01); *C09J 4/00* (2013.01); *C09J 133/08* (2013.01); *C08F 2800/20* (2013.01); *C08F 2810/20* (2013.01); *C09J 2203/334* (2013.01); *C09J 2205/302* (2013.01); *C09J 2433/00* (2013.01)

(58) Field of Classification Search
CPC .. C08J 7/385; C08J 133/08; C08J 4/00; C08F 220/12; C08F 220/14; C08F 220/18; C08F 2800/20; C08F 2810/20; C08K 5/3415; C09J 2203/334; C09J 2205/302; C09J 2433/00
USPC ...................................... 525/329.9
See application file for complete search history.

(56) References Cited

U.S. PATENT DOCUMENTS

| | | | |
|---|---|---|---|
| 7,288,161 B2 | 10/2007 | Hanley et al. | |
| 8,734,939 B2 | 5/2014 | Herr et al. | |
| 8,917,510 B2 | 12/2014 | Boday et al. | |
| 9,550,851 B2 | 1/2017 | Barner-Kowollik et al. | |
| 2013/0323907 A1* | 12/2013 | Oosterhuis | H01L 21/67132 438/460 |

FOREIGN PATENT DOCUMENTS

| | | | | |
|---|---|---|---|---|
| DE | 4104319 A1 * | 8/1992 | | C08K 5/3415 |
| DE | 4104319 A1 | 8/1992 | | |
| DE | 19909212 A1 * | 9/2000 | | |
| DE | 19909212 A1 * | 9/2000 | | C08J 3/24 |

OTHER PUBLICATIONS

DE 19909212 A1; Sep. 2000; machine translation.*
C. Gousse, et al., Macromolecules, 1998, pp. 314-321, vol. 31.
E. Goiti, el al., Macromolecular Rapid Communications, 2003, pp. 692-696, vol. 24.
E. Goiti, et al., European Polymer Journal, 2004, pp. 1451-1460, vol. 40.
PCT/US2016/052735, International Preliminary Report on Patentability dated May 29, 2018.
PCT/US2016/052735, International Search Report and Written Opinion dated Oct. 25, 2016.

* cited by examiner

*Primary Examiner* — Michael Bernshteyn

(57) ABSTRACT

A thermally reversible adhesive comprising a) a copolymer of i) a conjugated diene acrylate or methacrylate and ii) at least one acrylic monomer; and b) a bismaleimide cross-linking agent, a process for its preparation, and various end uses, are disclosed.

10 Claims, No Drawings

THERMALLY REVERSIBLE POLYMER CROSS-LINKING FOR PRESSURE SENSITIVE ADHESIVES

REFERENCE TO RELATED APPLICATIONS

The present application claims the benefit of U.S. Provisional Application No. 62/258,936, filed on Nov. 23, 2015.

FIELD OF THE INVENTION

The present invention is related to the field of pressure sensitive adhesives. More particularly, it relates to the field of heat activated pressure sensitive adhesives.

BACKGROUND

Adhesive labels and tapes are typically made up of substrates that are coated with pressure sensitive adhesives (PSAs). In order for the PSA to not stick to a substrate prior to desired placement and application, a liner, or "backing paper," may be used. This separable liner is usually relatively easy to remove and is often sent to a landfill. Thus, this method and means is inherently environmentally unfriendly and a potentially unnecessary cost.

Other means have been explored by researchers to avoid the problem of backing paper waste. These methods place the release coating on the surface of the paper or film label facestock opposite to the PSA and the construction is self-wound like tape. There are many deficiencies with this style of label construction; the most prominent issue is dealing with exposed PSA in equipment not designed for it.

Another strategy for eliminating the liner is to use heat activated PSAs in place of the standard PSA in the label construction. This style of label theoretically does not require any form of extra release agent since the PSA is substantially non-tacky after coating the PSA and through converting steps such as printing and slitting, but the PSA is heated above the activation temperature prior to application to a substrate (bottle, box, etc) which causes it to become tacky. Current systems are flawed due to high levels of low molecular weight additives such as tackifiers and plasticizers which can migrate and cause undesirable effects. In addition, these systems often prematurely activate when stored at elevated temperatures causing the roll of label construction to be discarded.

SUMMARY OF THE INVENTION

The invention provides a thermally reversible adhesive. The adhesive comprises, consists of, or consists essentially of a) a copolymer of i) a conjugated diene acrylate or methacrylate and ii) at least one acrylic monomer; and b) a bismaleimide crosslinking agent. The invention also provides a process for preparing the above thermally reversible adhesive composition comprising, consisting of, or consisting essentially of admixing a) a copolymer of i) furfuryl methacrylate or furfuryl acrylate and ii) at least one acrylic monomer; and b) a bismaleimide crosslinking agent. The invention also discloses various end uses for the thermally reversible adhesive composition.

DETAILED DESCRIPTION OF THE INVENTION

One broad aspect of the present invention is a thermally reversible adhesive composition comprising, consisting of, or consisting essentially of a) a copolymer of i) furfuryl methacrylate or furfuryl acrylate and ii) at least one acrylic monomer; and b) a bismaleimide crosslinking agent.

A "polymer," as used herein and as defined by F W Billmeyer, JR. in *Textbook of Polymer Science*, second edition, 1971, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer and oligomer molecular weights can be measured by standard methods such as, for example, size exclusion chromatography, short column size exclusion chromatography, or intrinsic viscosity. Generally, polymers have weight-average molecular weight (Mw) of 10,000 or more. Polymers may have extremely high Mw; some polymers have Mw above 1,000,000; typical polymers have Mw of 1,000,000 or less. As used herein, "low molecular weight polymer" means a polymer that has Mw of less than 10,000; and "high molecular weight polymer" means a polymer that has Mw of 10,000 or higher. Some polymers are crosslinked, and crosslinked polymers are considered to have infinite molecular weight.

Molecules that can react with each other to form the repeat units of an oligomer or a polymer are known herein as "monomers." Typical monomers have Mw of less than 400. Among the monomers useful in the present invention are molecules, for example, that have at least one carbon-carbon double bond.

The adhesive composition includes a conjugated diene acrylate or methacrylate. In various embodiments, the conjugated diene acrylate or methacrylate is furfuryl methacrylate.

In various embodiments, furfuryl (meth)acrylate is copolymerized with an acrylic monomer to form a methacrylic copolymer.

Examples of acrylic monomers include, but are not limited to acrylic acid (AA), methacrylic acid (MAA), esters of AA and MAA, itaconic acid (IA), crotonic acid (CA), acrylamide (AM), methacrylamide (MAM), and derivatives of AM and MAM, e.g., alkyl (meth)acrylamides. Esters of AA and MAA include, but are not limited to, alkyl, hydroxyalkyl, phosphoalkyl and sulfoalkyl esters, e.g., methyl methacrylate (MMA), ethyl methacrylate (EMA), butyl methacrylate (BMA), hydroxyethyl methacrylate (HEMA), hydroxyethyl acrylate (HEA), hydroxypropyl methacrylate (HPMA), hydroxybutyl acrylate (HBA), methyl acrylate (MA), ethyl acrylate (EA), butyl acrylate (BA), 2-ethylhexyl acrylate (EHA), cyclohexyl methacrylate (CHMA), benzyl acrylate (BzA), isooctyl acrylate, lauryl acrylate, stearyl acrylate, and phosphoalkyl methacrylates (e.g., PEM).

In various embodiments, non-acrylic components can also be present in the backbone. Examples include styrene (10 weight percent or less) and vinyl acetate (30 weight percent or less) or other vinyl ester monomers.

The furfuryl (meth)acrylate functionality is present in the adhesive composition in the range of from 0.5 weight percent to 10 weight percent. Any and all ranges between 0.5 and 10 weight percent are included herein and disclosed herein, for example, the furfuryl methacrylate functionality can be present in the adhesive composition in the range 2 to 8.

The furfuryl (meth)acrylate copolymer can be up to 99 weight percent of the adhesive composition. The furfuryl (meth)acrylate copolymer can be present in the range of from 50 to 99 weight percent in various embodiments, and in the range of from 65 to 80 weight percent in various other embodiments.

The adhesive composition also includes a thermally reversible crosslinking agent. In an embodiment, the crosslinking agent comprises a bismaleimide.

Examples of bismaleimide resins include, but are not limited to bis(3-ethyl-5-methyl-4-maleimidophenyl)methane, 4,4'-bismaleimido-diphenylmethane, 1,4-bismaleimido-2-methylbenzene and mixtures thereof; modified and partially advanced modified bismaleimide resins containing Diels-Alder comonomers; and a partially advanced bismaleimide based on 4,4'-bismaleimido-diphenylmethane and allylphenyl compounds or aromatic amines Examples of suitable Diels-Alder comonomers include styrene and styrene derivatives, bis(propenylphenoxy) compounds, 4,4'-bis (propenylphenoxy)sulfones, 4,4'-bis(propenylphenoxy)benzophenones, 4,4'441-methyl ethylidene) bis(2-(2-propenyl) phenol), Bis(3-ethyl-5-methyl-4maleimidophenyl)methane, 1,4-Di(maleimido) butane, N,N'-(1,3-Phenylene)dimaleimide, N,N'-(1,4-Phenylene)dimaleimide, N,N'-(o-Phenylene) dimaleimide, and 1,1'-(Methylenedi-4,1-phenylene)bismaleimide. Examples of commercially available modified bismaleimides based on 4,4'-bismaleimido-diphenylmethane and an allylphenyl compound, such as diallylbisphenol-A, are MATRIMID 5292A and MATRIMID 5292B from Huntsman Corporation. Other bismaleimides include Michael addition copolymers of bismaleimide and aromatic diamines, such as 4,4'-bismaleimido-diphenylmethane/4,4'-diaminodiphenylmethane. Still other bismaleimides are higher molecular weight bismaleimides produced by advancement reactions of the aforementioned bismaleimide resins. Exemplary bismaleimide resins are those based on 4,4'-bismaleimido-diphenylmethane. Alternative crosslinking agents (dienophiles) may include acetylenes and thioesters substituted with an electron-withdrawing group.

The crosslinking agent is generally present in the adhesive composition in a molar ratio between the crosslinking agent and the furfuryl moiety content in the range of range of from 0.5:1 to 2:1. In various embodiments, the molar ratio is in the range of 1:1 to 1.5:1.

The adhesive can also optionally contain a tackifier. Examples of tackifiers include, but are not limited to rosin ester resin, a non-hydrogenated aliphatic $C_5$ resin, a hydrogenated aliphatic $C_5$ resin, an aromatic modified $C_5$ resin, a terpene resin, a hydrogenated $C_9$ resin, or combinations thereof, where "$C_5$" and "$C_9$" refer to the number of carbon atoms in the starting materials used. Generally, the tackifier has a softening point from 65 to 180° C., and from 90 to 140° C. in various other embodiments. The tackifier also generally has a density from 0.92 g/cc to 1.06 g/cc and has a melt viscosity less than 1000 pascal second (Pa·s) at 175° C.

If a tackifier is present in the adhesive composition, it is generally present in an amount in the range of from 5 weight percent to 40 weight percent. Any and all ranges between 5 and 40 weight percent are included herein and disclosed herein, for example, the tackifier can be present in an amount in the range of from 10 and 35 weight percent or from 15 to 25 weight percent.

The adhesive composition can also optionally contain an energy absorber. This energy absorber may be added in order to increase the transfer rate or transfer efficiency of energy into the adhesive layer. It can also be used to enable some energy transfer technologies such as induction heating. Examples of additives include but are not limited to carbon black and other visible, infrared, or ultraviolet energy absorbing materials as well as iron particles including nanoparticles and other ferromagnetic materials.

If these materials are present in the adhesive composition, it is generally present in an amount in the range of from 0.1% weight percent to 15 weight percent. Any and all ranges between 0.1% and 15 weight percent are included herein and disclosed herein, for example, the tackifier can be present in an amount in the range of from 1 and 10 weight percent or from 1 to 5 weight percent.

The copolymer can be produced by any of a wide variety of polymerization methods. The polymerization may be a relatively simple, single-step operation, or the polymerization may be more complex, possibly involving multiple polymerizations. If multiple polymerizations are used, each of the various polymerizations may use the same monomer or monomers as any of the other polymerizations; or may use different monomer or monomers from any of the other polymerizations; or may use a combination of same monomer or monomers as any of the other polymerizations and different monomer or monomers from any of the other polymerizations. If multiple polymerizations are used, they may all be of the same type (for example, emulsion polymerization or suspension polymerization or dispersion polymerization); they may be different types (for example, one or more emulsion polymerizations preceding and/or following one or more suspension polymerizations); or a combination of same-type and different-type polymerizations may be used.

In various embodiments, the polymerization process involves the use of at least one initiator. An initiator is a compound that is capable of producing at least one free radical under conditions in which that free radical can interact with monomer. Conditions that cause some initiators to produce at least one free radical include, for example, elevated temperature, exposure to photons, exposure to ionizing radiation, reactions of certain compounds (such as, for example, oxidation-reduction pairs of compounds), and combinations thereof.

In various embodiments, water-soluble initiators can be used. Some suitable water-soluble initiators are, for example, persulfates, including, for example, sodium persulfate and ammonium persulfate. Some persulfate initiators generate radicals either by being heated or by being reacted with a reductant such as, for example, isoascorbic acid, sodium sulfoxylate formaldehyde, or sodium hydrogensulfite.

In various embodiments, oil-soluble initiators can be used. As used herein, an initiator is "oil-soluble" if it has low solubility in water. Some initiators that are suitable for use in the present invention include, for example, oil-soluble peroxides and oil-soluble azo compounds. Suitable oil-soluble peroxides include, for example, oil-soluble peroxyesters (also sometimes called percarboxylic esters or peroxycarboxylic esters), oil-soluble peroxydicarbonates, oil-soluble peroxides (such as, for example, oil-soluble dialkyl peroxides, oil-soluble diacyl peroxides, and oil-soluble hydroperoxides), oil-soluble peroxyketals, and oil-soluble ketone peroxides.

The copolymer and crosslinking agent can then be mixed together at room temperature in a batch process using a blade impeller with designs that are well known to those skilled in the art. Mixing rpms are generally optimized around rates that maintain good agitation throughout the mixture without entraining air. The adhesive composition can be applied to a web by a number of techniques such as wire wound rod, comma coater, gravure, roll coater, slide, slot die, knife over roll, or curtain coater. In various embodiments, additives such as surfactants, wetting agents, rheology modifiers, defoamers, and mechanical stabilizers can be added.

The adhesive composition is coated on a substrate such as, for example, paper (e.g. semi-gloss paper or thermal paper) or plastic film (e.g., polypropylene, polyethylene, or polyester). In various embodiments, the substrate has a thickness from 0.5 mil to 5 mil.

The coated substrate construction can include additional functional layers such as thermally insulating, energy absorbing, and primer layers. These layers are typically found between the adhesive and the paper or film substrate. The thermally insulating layer reduces energy (heat) loss from the adhesive layer into the substrate. This can be used to increase energy transfer rate or reduce the amount of energy needed to activate the thermally reversible crosslinking. The energy absorbing layer contains the same energy absorbing material discussed previously at the same levels. It does substantially the same action but removes the need for adding said materials into the adhesive formulation. The primer layer is used to improve adhesion between the thermally activated layer and the substrate when adhesion between the two layers is insufficient for the desired final application. Any combination of these layers, either mixed or individually, may be used.

The coated substrate is then dried using standard techniques to enable the furfuryl copolymer and the bismaleimide to react. In various embodiments, an oven is used. Drying conditions include a substrate temperature in the range of from 40° C. to 80° C. The actual drying temperature is dependent on the substrate used and the drying time is dependent on the reactivity at that temperature.

The crosslinked bonds are thermally reversible. The polymer can undergo decrosslinking to alter its physical properties. Initially, the polymer is not tacky, but once heated above the activation temperature, the composition becomes tacky and has the properties of a pressure sensitive adhesive. The activation temperature is generally greater than 110° C. In various embodiments, the activation temperature is in the range of from 110° C. to 200° C. Any temperature range from 110° C. to 200° C. is included herein and disclosed herein, for example, the activation temperature can be from 120° C. to 180° C. or from 140° C. to 165° C.

The change in tackiness corresponds to a decrease in the modulus of the polymer (as measured by dynamic mechanical analysis). The change in physical properties of the polymer is a result of the cleavage of thermally labile crosslink bonds, which are initially formed by the reaction of the polymer with a curing agent. When heated to the activation temperature, the reaction becomes reversible and these bonds undergo a retro Diels-Alder reaction.

The thermally reversible adhesive compositions of the present invention can be used to make heat activated PSAs, heat-seal coatings, and in-mold labels.

The thermally reversible adhesive compositions of the present invention can also be used to make linerless labels and tapes that are convenient to store and place, due to their potentially non-tacky properties at room temperature but which can be easily affixed to a desired substrate after being exposed to the activation temperature. While the industry generally defines "linerless labels" as being pressure sensitive adhesive labels that are self-wound and have a release coating on the backside of the facestock such that the finished product does not stick to other labels on the roll, the term "linerless" as used herein means simply that the inventive labels do not require a separable additional layer to prevent them from sticking to any other surface prior to affixing them to a desired surface, the separable additional layer then being wasted. Also in contrast with the industry use of the term, the inventive linerless labels and tapes do not require any kind of release coating in order to facilitate unwinding.

The labels and tapes themselves may be in woven or non-woven form; may be synthetic or natural (e.g., biobased) in constitution; and may be, in non-limiting example, cellulose based, for example, paper, cardboard or cotton; polyolefin based, such as polyethylene or polypropylene; polyamide based, such as nylon, silk or wool; polyester based, such as polylactic acid (PLA); or a combination thereof. By "biobased" is meant that such may include materials that involve synthetic modification of natural materials (e.g., PLA), materials prepared via natural microbiological activity (e.g., hydroxybutyrate), and the like.

The invention also includes a process for applying a linerless label or tape to a substrate, such as, for example, a package. In this process the coated, linerless tape or label is heated immediately prior to application to the substrate (or package) by standard label application equipment modified with heating equipment. This heating equipment can use various common heat sources such as hot air, infrared radiation, ultraviolet radiation, visible light radiation, focused energy such as LASER, and magnetic induction heating. This method can enable high speed label application. Alternatively, the linerless label or tape is placed on or against a surface of the desired substrate; and then heat is applied to the coated tape or label at a temperature above the activation temperature; to adhere the tape or label to the substrate. The source of the heat may be a heat gun or equivalent equipment on a larger scale, such as commercial scale heating.

EXAMPLES

Polymer Synthesis

Copolymers were synthesized in ethyl acetate via free radical polymerization of acrylic monomers with or without furfuryl methacrylate. A flask equipped with a condenser containing 80 g of ethyl acetate was heated to 77° C. under a nitrogen blanket. A solution containing 2.85 g of VAZO 64 (AIBN) as an initiator and 27 g of ethyl acetate was fed at 0.1 mL/min and after 5 minutes a monomer solution containing 390 g of ethyl acetate and 300 g of monomer was fed at 3.64 g/min. These feeds lasted for 190 minutes. After the end of the monomer feed, the initiator feed was continued for 30 minutes at the same rate. In order to convert any unreacted monomer, the initiator feed was increased to 0.35 mL/min for 30 minutes. At the end of the reaction, the mixture was cooled with no further purification. The furfuryl methacrylate polymer turned slightly yellow during polymerization.

The polymer compositions are shown in Tables 1 and 2, below.

TABLE 1

| Comparative Example A - 0% furfuryl methacrylate (FFMA) | Composition (g) | Composition (wt %) |
|---|---|---|
| 2-EHA | 228.00 | 76.0% |
| EA | 39.9 | 13.3% |
| MMA | 17.1 | 5.7% |

TABLE 1-continued

| Comparative Example A - 0% furfuryl methacrylate (FFMA) | Composition (g) | Composition (wt %) |
|---|---|---|
| FFMA | 0.0 | 0.0% |
| AA | 15.0 | 5.0% |
| n-DDM | 1.5 | 0.5% |
| Total | 300.0 | 100.0% |

TABLE 2

| Example 1 - 5% furfuryl methacrylate (FFMA) | Composition (g) | Composition (wt %) |
|---|---|---|
| 2-EHA | 247.50 | 82.5% |
| EA | 15.0 | 5.0% |
| MMA | 7.5 | 2.5% |
| FFMA | 15.0 | 5.0% |
| AA | 15.0 | 5.0% |
| n-DDM | 1.5 | 0.5% |
| Total | 300.0 | 100.0% |

A bismaleimide, (Bis(3-ethyl-5-methyl-4-maleimidophenyl)methane, was added to the polymer of Example 1. The ratio of bismaleimide group to furfuryl group was 1:1.

Samples for dynamical mechanical testing were prepared by first mixing components for 30 minutes. The samples were initially dried in a dish for about 2 weeks at ambient temperature. To ensure complete solvent removal, the samples were also stored under vacuum prior to measurement. The testing apparatus used 8 mm Al parallel plates with zero gap at testing temperature. The samples were loaded under ambient conditions. The modulus measurements were made in the linear region of stress/strain to study the elastic behavior of these materials.

Table 3 below shows Storage Modulus at specified temperatures, for specified times. Increase of modulus corresponds to forward crosslinking reaction/lower tack and vice versa.

TABLE 3

| | 50° C. | | 110° C. | |
|---|---|---|---|---|
| Storage Modulus, G' (Pa) | Initial | 200 min | Initial | 200 min |
| Example 1 (1/1 FMA to BMA) | $2 \times 10^4$ | $4 \times 10^4$ | $1 \times 10^4$ | $1 \times 10^3$ |

Application Testing

Coatings were made on 2 mil PET untreated films from Cheminstruments with a 1.6 mil gap byrd bar and then air dried to make an approximately 0.8 mil coating. The adhesive coated film was tested on stainless steel panels. The PSTC 101 Test method A, 180° peel test, was used and the force of removing the adhesive coated film was measured with an Instron in Newtons per inch of sample. Dwell times reflect the amount of time between adhesive application to the stainless steel test panel and when the adhesive coated film was removed for the test. The failure modes (FM) observed were either cohesively (C) where the adhesive itself fails from within or adhesive (A) where the adhesive removed cleanly from the substrate. Activations were done in a Mathis oven with the temperatures and activation times given Tables 4 and 5, below.

TABLE 4

| | Unactivated | | 80° C. annealed for 1 week | | 110° C. for 15 sec | | 110° C. for 5 min | |
|---|---|---|---|---|---|---|---|---|
| | Force | FM | Force | FM | Force | FM | Force | FM |
| 30 min dwell, Comparative Example A | 3.6 | C | 3.7 | C | 4.7 | C | 6.2 | C |
| 24 hr dwell, Comparative Example A | 5.2 | C | 7.6 | C | 6.3 | C | 6.2 | C |

TABLE 5

| | Unactivated | | 50° C. annealed for 16 hours | | 110° C. for 15 sec | | 110° C. for 5 min | | 170° C. for 15 sec | |
|---|---|---|---|---|---|---|---|---|---|---|
| | Force | FM | Force | FM | Force | FM | Force | FM | Force | FM |
| 30 min dwell, Example 1 | 9.0 | A | 7.7 | A | 11.9 | A | 12.0 | C | 15.6 | C |
| 24 hr dwell, Example 1 | 14.3 | A | 12.2 | A | 16.5 | C | 16.3 | C | 16.5 | C |

What is claimed is:

1. A thermally reversible adhesive composition comprising
   a) a copolymer of
      i) a conjugated diene acrylate or methacrylate and
      ii) at least one acrylic monomer; and
   b) a bismaleimide crosslinking agent, wherein the bismaleimide crosslinking agent is bis(3-ethyl-5-methyl-4-maleimidophenyl)methane.

2. The thermally reversible adhesive composition of claim 1 further comprising a tackifier.

3. The thermally reversible adhesive composition of claim 1 wherein the conjugated diene acrylate or methacrylate is furfuryl methacrylate.

4. The thermally reversible adhesive composition of claim 1 wherein the furfuryl methacrylate functionality is present in the copolymer in a range of from 0.5 weight percent to 10 weight percent.

5. A process for preparing the thermally reversible adhesive composition of claim 1 comprising admixing
   a) a copolymer of
      i) a conjugated diene acrylate or methacrylate; and
      ii) at least one acrylic monomer; and
   b) a bismaleimide crosslinking agent wherein the bismaleimide crosslinking agent is bis(3-ethyl-5-methyl-4-maleimidophenyl)methane.

6. The process of claim 5, wherein the conjugated diene acrylate is furfuryl methacrylate.

7. A heat-activated pressure-sensitive adhesive composition prepared from the thermally reversible adhesive composition of claim 1.

8. A heat-seal coating prepared from the thermally reversible adhesive composition of claim 1.

9. An in-mold label prepared from the thermally reversible adhesive composition of claim 1.

10. A linerless label prepared from the thermally reversible adhesive composition of claim 1.

* * * * *